July 12, 1932. V. J. CLIFFORD 1,866,752
LIFE GUARD OR OBSTRUCTION REMOVER FOR MOTOR ROAD AND OTHER VEHICLES
Filed April 21, 1930 4 Sheets-Sheet 3
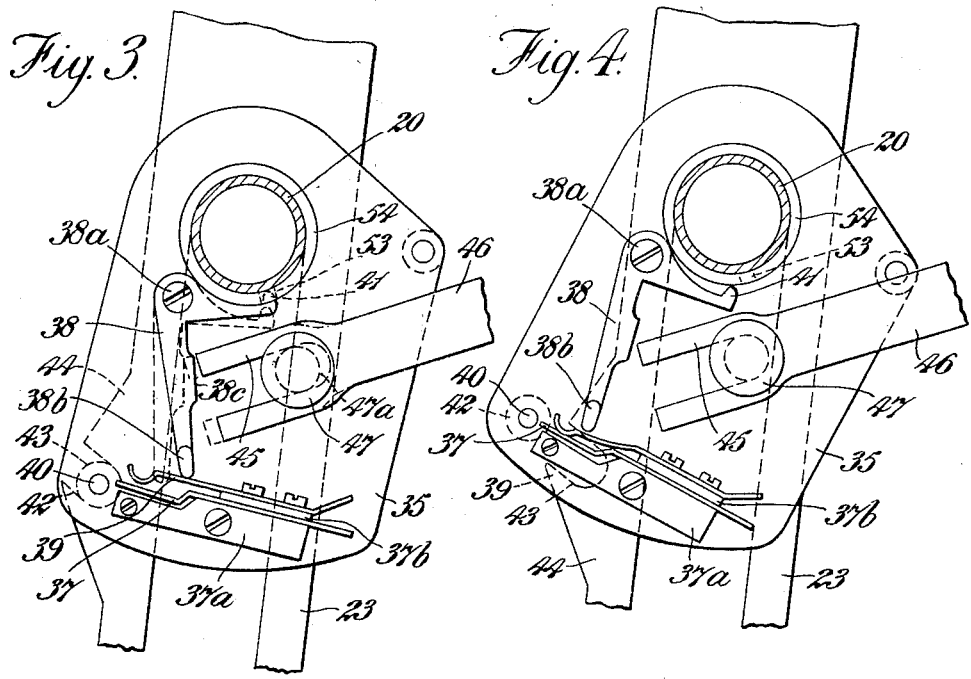
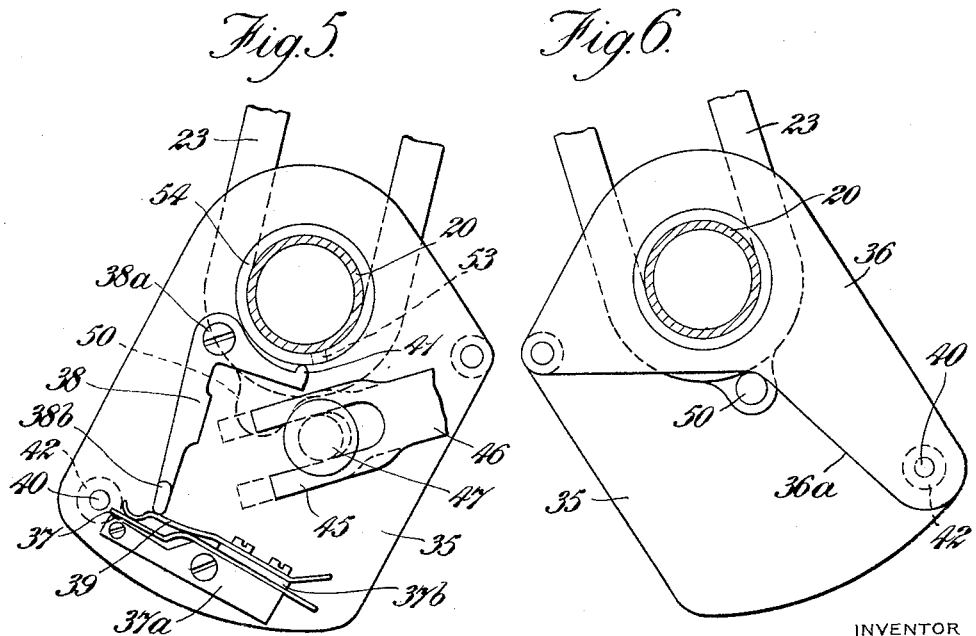
INVENTOR
V. J. Clifford
BY
Siggers & Adams
ATTORNEYS

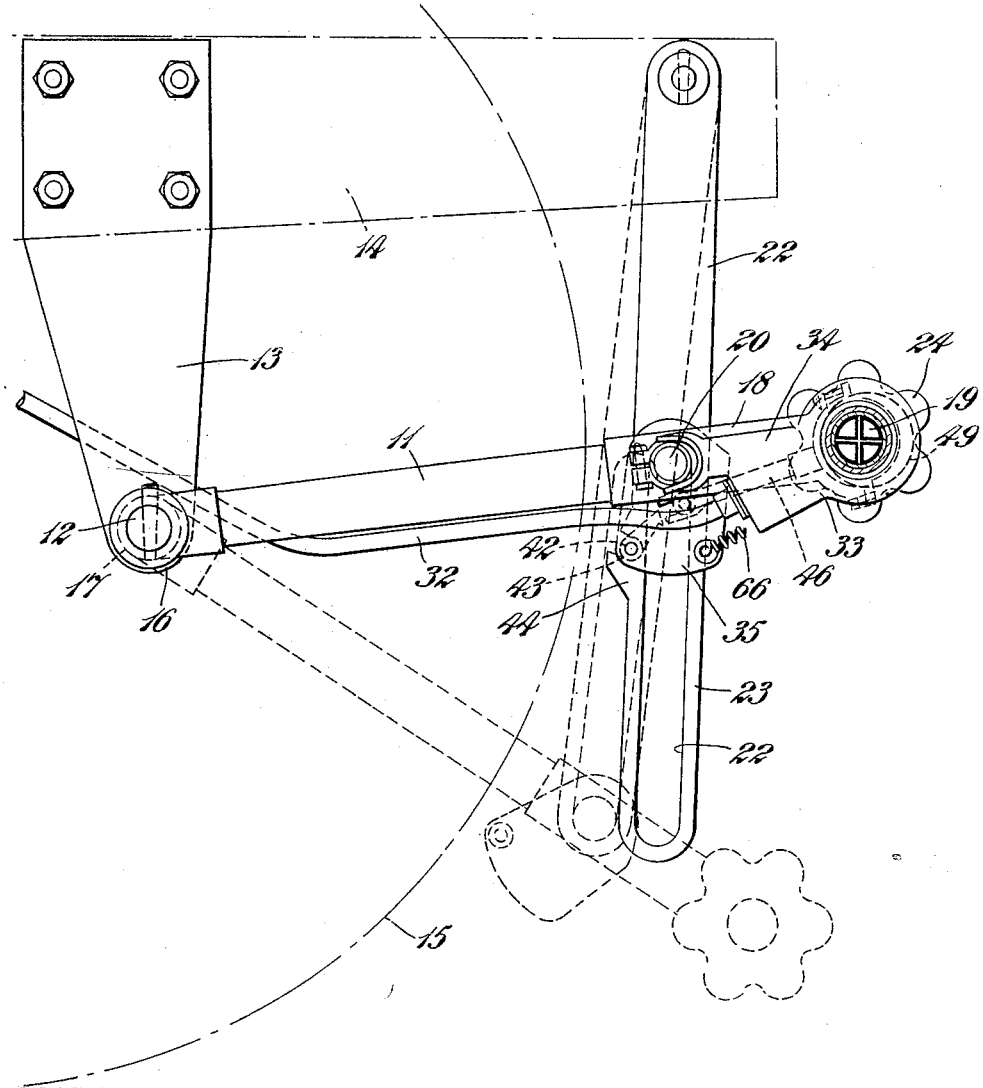

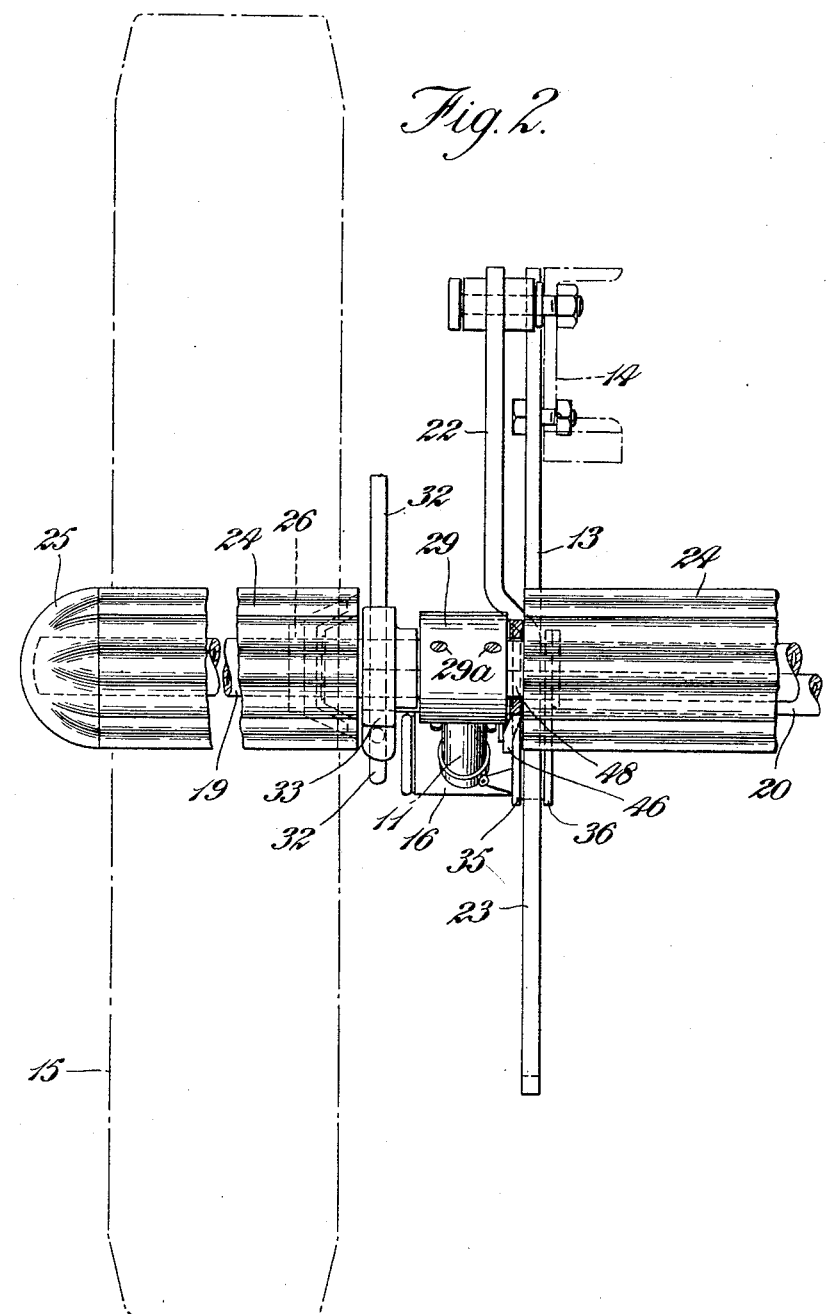

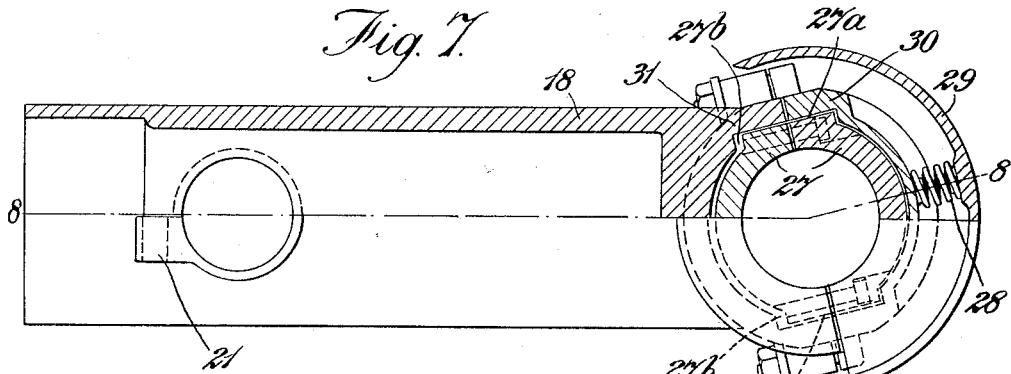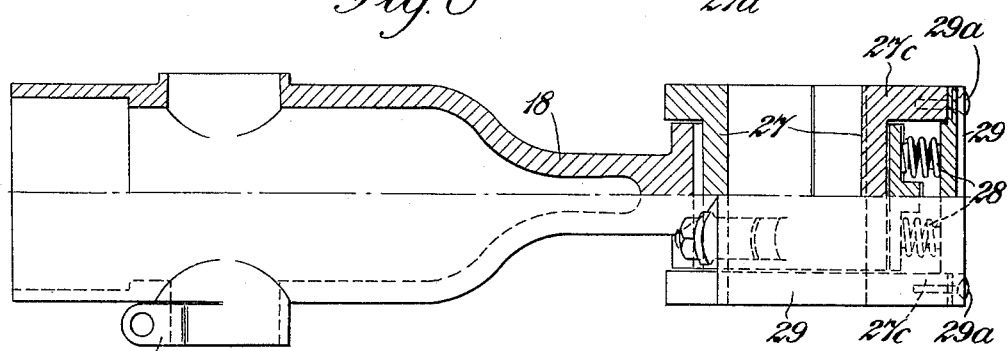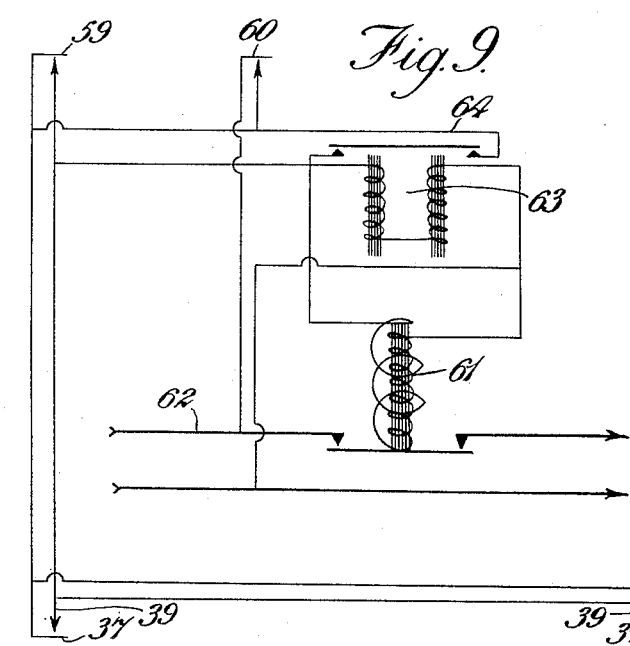

Patented July 12, 1932

1,866,752

UNITED STATES PATENT OFFICE

VERNON JOHN CLIFFORD, OF LONDON, ENGLAND

LIFEGUARD OR OBSTRUCTION REMOVER FOR MOTOR ROAD AND OTHER VEHICLES

Application filed April 21, 1930, Serial No. 446,118, and in Great Britain May 13, 1929.

This invention relates to lifeguards or obstruction-removers for motor road and other vehicles of the kind in which an elevated roller carried in a frame in front of the vehicle is adapted to be lowered and rotated in the opposite direction to that of the road wheels when the roller itself or some projection comes into contact with an obstruction, or when operated by the driver of the vehicle.

The present invention has for its principal object to provide an improved, simplified and effective construction of lifeguard or obstruction-remover of this kind.

In my prior British Patent No. 280,344, I have described and claimed a lifeguard or obstruction-remover of the kind referred to in which the roller is resiliently mounted in a normally elevated pivoted frame in such manner that rearward movement or rebounding of the roller in relation to its supporting frame will cause the roller to be rotated in the opposite direction to that of the road wheels of the vehicle and also to be lowered in its frame into close proximity with the ground. In the particular construction described in my prior British Patent aforesaid, the release of the pivoted frame carrying the roller from the normal elevated position is effected by a rearward movement of the driving shaft and armature of the electric motor driving the roller, such movement being occasioned by providing a worm drive from the motor shaft to the roller and retarding the rotation of the roller so that the rearward movement of the shaft is effected by the action of the worm, the motor circuit being closed by a switch actuated by the initial rearward movement of the roller when it strikes an obstacle.

According to the present invention, the release of the frame carrying the roller from the normal elevated position is effected by means, such as an eccentric or eccentrics or the equivalent, mounted upon the roller or roller shaft and actuating frame-supporting catch members through rods or the equivalent in such manner that in the first revolution of the roller under the action of an electric or other driving motor, springs or other means set into operation or released by the rearward movement of the roller or other guard member, the frame is released, thereby permitting the roller to fall into the lower operative position in which the rotation of the roller is continued or maintained by the driving motor aforesaid or by other suitable means. Conveniently, the roller is mounted in bearings capable of moving in a rearward direction, against the action of springs, to such an extent that when the roller encounters an obstruction the rearward movement of the roller is sufficient to close the switch referred to or to actuate other means by which rotation is initially imparted to the roller. The supporting frame may be pivoted at the rear to the chassis or to suitable brackets fixed thereto and is suspended in a suitable position at the rear of and adjacent the roller by means of stirrups or links adapted to co-operate with the catch members which are actuated by the eccentrics or the equivalent as before described. Advantageously, the bearings at the pivots of the supporting frame are of resilient character and may be of the type wherein the resilient material of the bearing is clamped so as to be non-rotatable either with respect to its housing or to the pivot pin. Thus, by suitably arranging the bearings, they may act to accelerate the downward drop of the frame when it is released and also to reduce the shock when the frame reaches its lowermost position. The frame may be provided with a transverse stay rod arranged to extend through suitable slots in the stirrups or links, the frame conveniently being supported in the lowermost position by the engagement of the said stay rod at the bottom of the slots in the stirrups or links. Furthermore, the gear casing of the driving gear of the roller may be held against rotation by means of a torque rod forked at its rear end to engage with the said stay rod. Preferably the roller is driven through a flexible shaft from an electric or other driving motor or is driven in any suitable manner from the road wheels or other moving part of the vehicle.

The invention further comprises the improved latch mechanism hereinafter described for maintaining the roller frame in the normal elevated position and for effecting the release of the same and the rotation of the roller when the latter meets with an obstruction.

The invention is hereinafter described by way of example with reference to the accompanying diagrammatic drawings, in which:—

Figure 1 is a view in side elevation illustrating one construction of the improved lifeguard or obstruction-remover according to the present invention;

Figure 2 is a part front elevation corresponding to Figure 1;

Figure 3 is a view in side elevation drawn to an enlarged scale, illustrating the latch mechanism shown in Figure 1, the parts being shown in the normal inoperative positions;

Figure 4 is a view similar to Figure 3 with the parts in the released positions;

Figure 5 is a view similar to Figure 3 showing the latch gear in the position it assumes when the pivoted frame carrying the roller has fallen into the working position;

Figure 6 is a part rear elevation corresponding to Figure 5;

Figure 7 is a part sectional elevation, drawn to an enlarged scale, illustrating the method of mounting the roller;

Figure 8 is a part sectional plan view corresponding to Figure 7; and

Figure 9 is a diagram of a suitable electrical circuit.

In carrying the invention into effect according to a preferred construction and with reference to the accompanying diagrammatic drawings, the roller-supporting frame comprises a pair of tubular arms 11 pivoted at their rear extremities upon pivot pins 12 fixed at the lower ends of brackets 13 mounted upon the main side members 14 of the chassis and arranged in front of the axis of the front wheels 15. Preferably, the rear ends of the arms 11 are each provided with a tubular housing 16 arranged to accommodate a resilient bushing 17 located between the housing 16 and the pivot pin 12 to render the bearings resilient for the purpose of absorbing shocks. At their outer ends the arms 11 are provided with bearing casings 18 adapted to house the main bearings of the roller spindle 19. The supporting arms 11 are connected together and stiffened by means of a transverse stay rod 20 which may extend through holes in the arms 11 and may be held in clamps 21 formed or provided upon the bearing casings 18, such stay rod 20 extending through vertical slots 22 in stirrups or links 23 pivoted at their upper ends to the main side members 14 of the chassis, conveniently with the provision of resilient bushings, the engagement of the stay rod 20 at the bottom of the slots 22 in the stirrups or links 23 determining the lowermost position of the roller-supporting frame. The stirrups 23 may be of telescopic or other equivalent extensible construction so that when the pivoted frame, comprising the arms 11, is in the uppermost position, no downwardly projecting portions of the stirrups are presented.

The roller 24, which may be made in four longitudinal sections as in the prior British patent, may be constructed of corrugated aluminium sheet or otherwise as desired, fixed to suitable supporting plates, flanges or the like mounted upon the roller spindle 19. If desired, however, the roller 24 may be otherwise suitably constructed, for example as described in my prior British specification. In the particular construction shown, the roller 24 consists of corrugated tubular sections fixed, for example, between domed end caps 25 and flanges 26 or the like pinned or otherwise fixed to the roller spindle 19.

As shown more particularly in Figures 7 and 8, the roller is carried in bearings each comprising a pair of split bushes 27 formed with diametrically disposed projecting flat portions 27a engaging slidably in corresponding slots or recesses 27b in the bearing housings constituted by caps 30 bolted to the front enlarged semicircular portions 31 of the bearing casing 18. The slots or recesses 27b are adapted to provide a small clearance at the rear of the projecting portions 27a of the bushes 27 and the front halves of the latter are formed at their ends with flanges 27c to which a semi-cylindrical shield 29 is fixed as by means of screws 29a. Compression springs 28 are interposed between the bearing cap 30 and the shield 29, such springs being located, for example, by the engagement of their ends with projections on the respective parts. Preferably the bushes 27 are split in a plane at right angles to the axis of the rod 46, hereinafter referred to, when the latter is in the inoperative position, so that when the roller encounters an obstruction the thrust is transmitted directly through the rod 46 to the latch gear.

The electric driving motor is fixed to the chassis in any convenient position and drives the roller 24 through flexible shafting 32 or the like, the drive to the roller 24 consisting of a pair of bevel gear wheels or a worm and worm wheel mounted in a gear casing 33 disposed rotatably upon the roller spindle 19. The casing 33 is provided with a rearwardly extending arm 34 which is forked or otherwise adapted to engage with the transverse stay rod 20 of the supporting frame so as to prevent rotation of the gear casing 33 about the axis of the roller spindle 24 while avoiding any interference with the rearward movement of the roller 24 under the action of impact. The forked arm or torque member 34 is preferably arranged at an inclination with respect to the axis of the driving pinion or worm so that the flexible driving shaft 32 may pass beneath the stay rod 20.

The switch operated by the rearward movement of the roller for controlling the motor and the catch or catches serving to maintain the supporting frame normally in the uppermost position are operated by the means hereinafter described and shown more particularly in Figures 3 to 6 of the accompanying drawings. At each side of the apparatus a pair of plates 35, 36 is pivoted upon the transverse stay rod 20, one on either side of the respective stirrup 23, the plates being spaced apart and connected as by means of rivets, and the plate 36 carrying the switch gear and latch mechanism. A switch lever 38, which is in the form of a bell crank lever pivoted on a screw 38a, is fitted at the lower end with an insulated member 38b adapted to co-operate with a spring contact arm 39 so that when the lever 38 is moved to the position shown in dotted lines in Figure 3, the spring arm 39 is caused to make contact with a second contact arm 37, the contacts 37, 39 being fixed upon an insulated support 37a and being separated by an insulating spacing member 37b. A roller 42 is mounted on a spindle 40 extending between and connecting the plates 35, 36, such roller 42 being adapted to engage with a rearwardly directed open slot 43 in a rearwardly projecting part 44 of the respective stirrup 23, such slot 43 being curved to a radius drawn from the axis of the transverse stay rod 20. The spring contact arm 39 preferably is adapted, as shown, to act as a spring for maintaining the switch lever 38 in the normal inoperative position. The other or upper arm of the lever 38 is adapted at its extremity to form a trigger 41 which normally engages with a suitable slot or recess 53 in a collar 54 fixed upon the transverse stay rod 20 as by means of a set-screw, such engagement of the trigger 41 holding the latch gear against displacement from the inoperative position until the arm 38 is moved by the rod 46 to close the switch 39, 37. The lever 38 is actuated by the rear extremity 45 of the rod 46 which conveniently is of forked formation, as shown, for slidable engagement with a pin 47 fixed to the respective side plate 35, which forked rod is fitted at its front end to the strap 48 (Figure 2) of an eccentric 49 (Figure 1) mounted upon the roller spindle 19. The downwardly extending arm of the lever 38 is preferably formed with an abutment 38c with which the forked end 45 of the lever 46 co-operates, and the pin 47 is so arranged that in the normal position of the parts a clearance space 47a is provided enabling the rod 46 to be moved rearwardly to close the switch 39, 37, the rod 46 only engaging the pin 47 when the roller commences to rotate, and the rod 46 is moved further rearwardly by the action of the eccentric 49 to which it is connected. The eccentric 49 and the rod 46 connected thereto, the abutment 38c on the downwardly extending arm of the lever 38, and the trigger 41 are so arranged in relation to one another that the slight rearward movement of the roller 24 in its bearings against the action of the springs 28 when the roller encounters an obstruction is sufficient to move the lever 38 to the position shown in dotted lines in Figure 3 so as to close the switch 39, 37 controlling the circuit of the driving motor, while when the circuit is closed and the roller 24 commences to rotate, the action of the eccentric 49 moves the rod 46 connected thereto rearwardly to such an extent that, by engagement of the forked end 45 of the rod 46 with the pin 47 projecting from the respective side plates 35, the connected side plates 35, 36 are moved bodily rearwardly about the axis of the transverse stay rod 20 so that the roller 42 or the like upon the spindle 40 is disengaged from the slot 43 in the respective stirrup 23, thereby allowing the frame supporting the roller 24 to fall into the lowermost position, as shown in dotted lines in Figure 1 and in Figures 5 and 6.

In order to ensure that the switch is maintained closed while the roller 24 is in the lowermost or operative position and also to prevent the reciprocating rod 46 from hammering against the abutment 38c on the lever 38, a ramp 50 is provided at the lower end of the stirrup 23 and the plate 36 is shaped, as shown in Figure 6, to provide a cam surface 36a which co-operates with the ramp 50 when the roller-carrying frame is in its lowermost position so as to turn the latch gear frame still further rearwardly from the position shown in Figure 4 about the axis of the transverse stay rod 20 so that, as shown in Figure 5, the continuously reciprocating rod 46 will not strike against the lever 38, while at the same time the latch gear frame is prevented from swinging forwardly under the action of gravity, which swinging movement, if permitted, might result in the opening of the switch 39, 37.

It will be understood that the latch gear herein described may be provided on both sides of the apparatus or at one side only if desired.

The resilient pivotal bearings at the rear end of the arms 11 may be of the type wherein the resilient bushing 17 is clamped or otherwise fixedly secured to the housing 16 and to the pivot pin 12. Thus, if the bearings are so arranged that no torque exists in the resilient bushing 17 when the roller-supporting frame is in the intermediate position between the upper and lower positions, it will be seen that when the arm is in its normal or carrying position the tension on the resilient bushings tends to reduce vibration and also to accelerate the downward drop of the frame when the latch mechanism is released.

Moreover, when the arm has fallen past such intermediate position, a retarding torque exists tending to cushion or reduce the shock when the frame reaches the lowermost position.

As shown in Figure 9, a main switch 60 is provided which is incorporated with the engine switch so that the lifeguard or obstruction-remover is always ready for action when the engine of the vehicle is running, and so that the engine of the vehicle cannot be started without completing the circuit to the motor of the lifeguard, if such motor is at rest. A switch 59 is arranged in parallel with the switches 37, 39 associated with the latch devices so that the apparatus may be under the control of the driver for hand operation, as distinct from automatic operation by the action of the roller. A solenoid switch 61 is inserted in one of the main leads 62 from the battery to the motor of the lifeguard, while relatively light leads connect up the main battery leads with the switches 37, 59 and 60 and a short-circuiting switch 63 in the manner shown. The closing of either or both of the switches 37 under the action of impact on the roller 24 or, alternatively, closing of the switch 59 by the driver, energizes the coils of the shorting switch 63, it being understood that the switch 60 is automatically closed when the engine is running. These coils attract an armature 64 which, in turn, closes the circuit of the solenoid switch 61 and at the same time short-circuits the switches 37 and 59, thus ensuring that the solenoid switch circuit remains constantly closed even if the switches 37 and/or 59 are opened by jolting or jarring of the vehicle. The opening of the main engine switch operates the switch 60 to break the circuit, thereby de-energizing the coils of the switches 61 and 63, thus allowing all the parts to be returned to normal by suitable mechanism.

In returning the mechanism to the normal position, the roller 24 is first turned to a position marked on its periphery in which the eccentric rod 46 is drawn forwardly away from the lever 38 as far as possible. The roller-supporting frame is then raised, the roller 42 riding up the rear face of the stirrup 23 and up a cam face formed by the rearwardly projecting part 44 immediately below the slot 43 in the stirrup until the roller 42 or the equivalent engages in the slot 43 in the rear of the stirrup 23 under the action of gravity and, if desired, by means of a suitable spring 66 (Figure 1).

One or more shields or guards may be provided in conjunction with the roller so as to support any person struck by the roller and to prevent such person from being thrown on to the front of the vehicle. Any or all of the shields or guards may be resiliently or removably mounted and also may be associated or provided with switches in such manner that if an obstruction strikes one of the shields instead of the roller 24, the circuit of the motor operating the roller will be closed so that the lifeguard or obstruction-remover is at once set in operation. For example, a grid-like guard may be arranged to extend at the rear of the roller and above the same, the upwardly extending part of the guard being fitted with contact members which, encountering an obstruction, serve to close the circuit of the motor. The guard may have side extensions covering the front wheels of the vehicle.

It will be understood that the invention is not limited to the particular construction hereinbefore described. For example, the driving motor may be associated with the roller-supporting frame, in which case the flexible driving shaft may be dispensed with. Further, the roller may be mounted in any other suitable manner, so as to be capable of the necessary movement for the operation of the latch mechanism. Furthermore, the initial rotation of the roller for the operation of the eccentric to free the roller-carrying frame may be effected by spring or other means adapted to be released or set into operation by a catch or the equivalent operated by the rearward movement of the roller due to impact, the continued rotation of the roller when in its lowermost position being effected either by an electric or other motor or by means of auxiliary road wheels geared to the roller or otherwise, as desired. Cams may be used in place of eccentrics.

What I claim is:—

1. A lifeguard or obstruction-remover for vehicles comprising, in combination, a roller; a pivoted frame for the roller permitting lateral movement thereof; a catch to hold the pivoted frame in an elevated position; and eccentric means actuated by lateral movement of the roller when encountering an obstruction to release the catch and thus permit the pivoted frame and roller to fall by gravity.

2. A lifeguard or obstruction-remover for vehicles comprising, in combination, a roller; a pivoted frame for the roller permitting lateral movement thereof; a pair of slotted stirrups pivoted at their upper ends on the vehicle frame and depending from their pivoted ends; means on said stirrups and said pivoted frame providing a catch to hold the pivoted frame elevated; and means actuated by lateral movement of the roller when encountering an obstruction to release the catch and thus permit the pivoted frame and roller to fall by gravity; the slotted stirrups stopping downward movement of the roller past a certain point.

3. A lifeguard or obstruction-remover for vehicles comprising, in combination, a roller; a pivoted frame mounting the roller at its free end; a resilient bushing at the pivoted end of the frame, rendering the frame bearing resilient to absorb shocks; a catch to hold the pivoted frame in an elevated position; and means actuated by lateral movement of the roller when encountering an obstruction to release the catch and thus permit the pivoted frame and roller to fall by gravity.

4. A lifeguard or obstruction-remover for vehicles comprising, in combination, a roller; a pivoted frame mounting the roller at its free end; a shield also on the free end of the frame; springs interposed between the shield and the roller mounting means to absorb shocks imparted to the shield; a catch to hold the pivoted frame in an elevated position; and means actuated by lateral movement of the roller when encountering an obstruction to release the catch and thus permit the pivoted frame and roller to fall by gravity.

5. A lifeguard or obstruction-remover comprising, in combination, an electric motor; a roller; means mechanically connecting the motor and roller; a frame rotatably mounting the roller at its free end; said mounting being so constructed and arranged that the roller may be moved to a limited extent laterally when struck by an object; and means connected with the roller and actuated by its lateral movement to effect closing of the motor circuit to rotate the roller.

6. A lifeguard or obstruction-remover comprising, in combination, an electric motor; a roller; means mechanically connecting the motor and roller; a pivoted frame rotatably mounting the roller at its free end; said mounting being so constructed and arranged that the roller may be moved to a limited extent laterally when struck by an object; means connected with the roller and actuated by its lateral movement to effect closing of the motor circuit to rotate the roller; and latch means to hold the frame with the roller normally elevated; said roller-connected means also releasing the latch means to permit the frame to move downwardly so that the roller approaches the ground.

7. A lifeguard or obstruction-remover for vehicles comprising, in combination, a roller; a pivoted frame for the roller permitting lateral movement thereof; a catch to hold the pivoted frame in an elevated position; eccentric means actuated by lateral movement of the roller when encountering an obstruction to release the catch and thus permit the pivoted frame and roller to fall by gravity; a motor; a motor switch constructed and arranged to be closed when said catch is released; and means mechanically connecting the roller and the motor so that when said switch is closed, the roller starts to rotate.

8. A lifeguard or obstruction-remover for vehicles comprising, in combination, a roller; a pivoted frame for the roller permitting lateral movement thereof; a pair of slotted stirrups pivoted at their upper ends on the vehicle frame depending from their pivoted ends; means on said stirrups and said pivoted frame providing a catch to hold the pivoted frame elevated; a motor; a motor switch; means mechanically connecting the roller with the motor; and means actuated by lateral movement of the roller when encountering an obstruction to close said switch and to release the catch and thus permit the pivoted frame and roller to fall by gravity; the slotted stirrups stopping downward movement of the roller past a certain point.

VERNON JOHN CLIFFORD.